United States Patent
Dial et al.

(10) Patent No.: US 10,190,206 B2
(45) Date of Patent: Jan. 29, 2019

(54) DUAL PHASE MAGNETIC MATERIAL COMPONENT AND METHOD OF FORMING

(71) Applicant: General Electric Company, Schenectady, NY (US)

(72) Inventors: Laura Cerully Dial, Clifton Park, NY (US); Richard DiDomizio, Charlton, NY (US); Francis Johnson, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 146 days.

(21) Appl. No.: 15/460,650

(22) Filed: Mar. 16, 2017

(65) Prior Publication Data

US 2017/0183764 A1    Jun. 29, 2017

Related U.S. Application Data

(62) Division of application No. 14/068,937, filed on Oct. 31, 2013, now Pat. No. 9,634,549.

(51) Int. Cl.
*H02K 15/12* (2006.01)
*H02K 19/02* (2006.01)
(Continued)

(52) U.S. Cl.
CPC ............ *C23C 8/04* (2013.01); *C21D 1/06* (2013.01); *C21D 9/00* (2013.01); *C22C 38/38* (2013.01);
(Continued)

(58) Field of Classification Search
CPC ........ H02K 19/02; H02K 15/12; H01F 1/147; H01F 7/02; H01F 41/02; C21D 1/26; C21D 9/00; C21D 2221/00; C23C 8/26
(Continued)

(56) References Cited

U.S. PATENT DOCUMENTS

| 4,121,953 A | 10/1978 | Hull |
| 6,080,245 A * | 6/2000 | Uchida ............... B22F 9/04 |
| | | 148/103 |

(Continued)

FOREIGN PATENT DOCUMENTS

| JP | H0636664 B2 | 5/1994 |
| JP | 2000312446 A | 11/2000 |
| JP | 2002180215 A | 6/2002 |

OTHER PUBLICATIONS

Shin et al, "Heavy metal ion adsorption behavior in nitrogen-doped magnetic carbon nanoparticles: Isotherms and kinetic study", Journal of Hazardous Materials 190 (2011) 36-44, published on 2011.*

(Continued)

*Primary Examiner* — John K Kim
(74) *Attorney, Agent, or Firm* — GE Global Patent Operation; Nitin Joshi

(57) ABSTRACT

A magnetic component having intermixed first and second regions, and a method of preparing that magnetic component are disclosed. The first region includes a magnetic phase and the second region includes a non-magnetic phase. The method includes mechanically masking pre-selected sections of a surface portion of the component by using a nitrogen stop-off material and heat-treating the component in a nitrogen-rich atmosphere at a temperature greater than about 900° C. Both the first and second regions are substantially free of carbon, or contain only limited amounts of carbon; and the second region includes greater than about 0.1 weight % of nitrogen.

10 Claims, 4 Drawing Sheets

(51) Int. Cl.
  *H01F 1/147* (2006.01)
  *H01F 7/02* (2006.01)
  *C23C 8/04* (2006.01)
  *C21D 9/00* (2006.01)
  *C23C 8/26* (2006.01)
  *H02K 19/10* (2006.01)
  *C22C 38/38* (2006.01)
  *C21D 1/06* (2006.01)
  *C21D 1/26* (2006.01)

(52) U.S. Cl.
  CPC ............ *C23C 8/26* (2013.01); *H01F 1/147* (2013.01); *H02K 15/12* (2013.01); *H02K 19/02* (2013.01); *H02K 19/103* (2013.01); *C21D 1/26* (2013.01); *C21D 2221/00* (2013.01)

(58) Field of Classification Search
  USPC .................................. 310/46; 148/121, 306
  See application file for complete search history.

(56) References Cited

U.S. PATENT DOCUMENTS

| | | | |
|---|---|---|---|
| 6,245,441 B1 | 6/2001 | Yokoyama et al. | |
| 6,255,005 B1 | 7/2001 | Yokoyama et al. | |
| 6,675,460 B2* | 1/2004 | Reiter, Jr. | B22F 7/06 |
| | | | 148/514 |
| 7,377,986 B2* | 5/2008 | Schoen | C21D 8/1205 |
| | | | 148/111 |
| 7,696,662 B2* | 4/2010 | Komuro | B82Y 10/00 |
| | | | 148/101 |
| 7,846,271 B2 | 12/2010 | Choi et al. | |
| 9,634,549 B2* | 4/2017 | Dial | H01F 1/147 |
| 2003/0062791 A1 | 4/2003 | Reiter, Jr. et al. | |
| 2012/0021917 A1 | 1/2012 | Sakamoto et al. | |
| 2012/0288396 A1* | 11/2012 | Lee | C22C 38/04 |
| | | | 420/74 |
| 2013/0022833 A1* | 1/2013 | Wakade | C22C 38/004 |
| | | | 428/611 |
| 2015/0011574 A1 | 1/2015 | Nishi et al. | |
| 2017/0183764 A1* | 6/2017 | Dial | C23C 8/04 |

OTHER PUBLICATIONS

Dong et al, "Carbon-Based Dots Co-doped with Nitrogen and Sulfur for High Quantum Yield and Excitation-Independent Emission", Angew. Chem. Int. Ed. 2013, 52, 7800-7804, published on 2013.*

J.W.Simmons, "Overview: High-Nitrogen Alloying of Stainless Steels", Materials Science and Engineering, Mar. 30, 1996, vol. 207, Issue 2, pp. 159-169.

Mita et al., "Magnetic Screw Rod Using Dual State 0.6C—13Cr—Fe Bulk Magnetic Material", Journal of Applied Physics, May 15, 2002, vol. 91, Issue 10, 4 Pages.

André Paulo Tschiptschin., Predicting Microstructure Development During High Temperature Nitriding of Martensitic Stainless Steels Using Thermodynamic Modeling, Materials Research, 2002, vol. 5, No. 3, pp. 257-262.

Mita et al., "Study of Internal Permanent Magnet Rotor Made of 0.6C—13Cr—Fe Dual State Magnetic Material", Journal of Applied Physics, May 15, 2003, vol. 93, No. 10, 4 Pages.

Mita et al., "A Study of Retainer Ring Made of 13.5Cr—0.6C—Fe Dual State Magnetic Material", Journal of Magnetism and Magnetic Materials, Jan. 2003, vols. 254-255, pp. 272-274.

Czerwiec et al., "Fundamental and Innovations in Plasma Assisted Diffusion of Nitrogen and Carbon in Austenitic Stainless Steels and Related Alloys", Plasma Processes and Polymers, Jul. 18, 2009, vol. 6, Issue 6-7, pp. 401-409.

Rudnizki et al., "Phase-Field Modeling of Austenite Formation from a Ferrite plus Pearlite Microstructure during Annealing of Cold-Rolled Dual-Phase Steel", Metallurgical & Materials Transactions, Aug. 2011, vol. 42, Issue 8, pp. 2516-2525.

Wan et al., "Analysis of Magnetism in High Nitrogen Austenitic Stainless Steel and Its Elimination by High Temperature Gas Nitriding", J. Mater. Sci. Technology, 2011,vol. 27, Issue 12, pp. 1139-1142.

* cited by examiner

DUAL PHASE MAGNETIC MATERIAL COMPONENT AND METHOD OF FORMING

CROSS REFERENCE TO RELATED APPLICATIONS

This patent application is a divisional of U.S. Non-Provisional patent application Ser. No. 14/068,937, entitled "DUAL PHASE MAGNETIC MATERIAL COMPONENT AND METHOD OF FORMING", filed on Oct. 31, 2013, which is herein incorporated by reference in its entirety.

STATEMENT REGARDING FEDERALLY SPONSORED RESEARCH & DEVELOPMENT

This invention was made with Government support under contract number DE-EE0005573, awarded by the United States Department of Energy. The Government has certain rights in the invention.

BACKGROUND

The invention relates generally to a component having multiple magnetic and nonmagnetic regions, and a method of forming the same. More particularly, the invention relates to a component having multiple magnetic and nonmagnetic regions, and formation of the same by nitriding.

The need for high power density and high efficiency electrical machines (i.e. electric motors and generators) has long been prevalent for a variety of applications, particularly for hybrid and/or electric vehicle traction applications. The current trend in hybrid/electric vehicle traction motor applications is to increase rotational speeds to increase the machine's power density, and hence reduce its mass and cost. However, it is recognized that when electrical machines are used for traction applications in hybrid/electric vehicles, there is a clear tradeoff between power density, efficiency, and the machine's constant power speed range—and that this tradeoff presents numerous design challenges.

The power density of an electric machine may be increased by increasing the machine size, improving thermal management, increasing rotor speed, or by increasing the magnetic utilization. The magnetic utilization may be increased by using a combination of processing and alloying of a rotor lamination to create a dual phase magnetic material by developing localized areas of high and low permeability. The localized areas of high and low permeability generally reduce flux losses during rotor operation.

A range of ferrous based soft magnetic compositions of the rotor lamination may be austenitized by a combination of processes to form regions of low permeability. This phase transformation at selected regions is normally thermally driven in the presence of carbides in the alloy. Upon local heating, the carbides that are present at selected locations dissolve in the matrix and depress the martensite start temperature, thereby aiding the stabilization of austenite regions at room temperature. However, the presence of carbides in a magnetic microstructure is known to increase coercivity and to lower the magnetic saturation, as compared to traditional ferrous-based magnetic steels. A different method of stabilizing the austenite phase at room temperature in intermediate regions of the soft magnet, while starting from a substantially single phase microstructure, is desired to decrease the coercivity. Embodiments of the present invention address these and other needs.

BRIEF DESCRIPTION

In accordance with one aspect of the invention, a magnetic component having intermixed first and second regions is disclosed. The first region includes a magnetic phase and the second region includes a non-magnetic phase. Both first and second regions have a concentration of carbon, if present, that is less than about 0.05 weight %, total. The second region includes greater than about 0.4 weight % of nitrogen.

In accordance with another aspect of the invention, a method of preparing a magnetic component is disclosed. The method includes mechanically masking pre-selected sections of a surface portion of the component by using a nitrogen stop-off material and heat-treating the component in a nitrogen-rich atmosphere at a temperature greater than about 900° C., so as to form intermixed first and second regions in the magnetic alloy. Both first and second regions have a concentration of carbon, if present, that is less than about 0.05 weight %, and the second region includes greater than about 0.4 weight % of nitrogen. Various other features and advantages will be made apparent from the following detailed description and the drawings.

BRIEF DESCRIPTION OF THE DRAWINGS

The drawings illustrate preferred embodiments presently contemplated for carrying out the invention.

DETAILED DESCRIPTION

Figure 1:
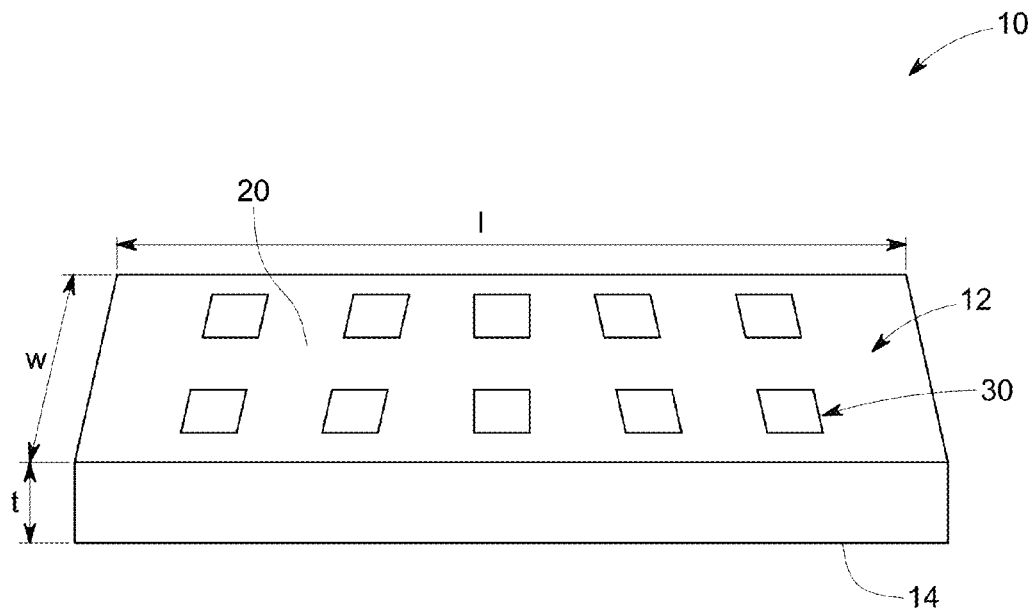
FIG. 1 illustrates a dual phase magnetic component, in accordance with one embodiment of the invention.

Different embodiments of the present invention relate to a magnetic component, a magnetic composition of the magnetic component, and a method of forming the magnetic component.

In one embodiment of the invention, a magnetic component is disclosed. The term "magnetic component" as used herein may be a magnetic part of any product, such as for example, a rotor lamination of a motor. The magnetic component described herein has intermixed first and second regions, where the first region includes a magnetic phase and the second region includes a non-magnetic phase. The "intermixed first and second regions" hereby means that there are many first regions and second regions that are in the vicinity of each other.

Thus, the magnetic component has dual magnetic regions with one set of regions having a magnetic phase, and another set having a non-magnetic phase. As used herein, the "magnetic phase" is a region where greater than about 99 volume % of the region is magnetic, and in general, would act as a magnetic region. Further, a "non-magnetic phase" may be the region where greater than about 90 volume % of the region is non-magnetic. The magnetic component as used herein is usually prepared from a single material. As an example, the material may be a composite magnetic member which is formed by providing a ferromagnetic portion and a non-magnetic portion, by nitriding in a controlled atmosphere. When the magnetic component is made using a single material, the negative effects of bonding a ferromagnetic portion and a non-magnetic portion are reduced by ensuring reliability, hermeticity, and the bond strength of the magnetic component.

The "magnetic phase" as used herein is a material in a magnetic state having a relative permeability greater than 1. In one embodiment, the relative permeability of the magnetic phase of the first region of the magnetic component is greater than 100, and a saturation magnetization is greater than 1.5 Tesla. A "non-magnetic phase" as used herein has greater than about 90 volume % of the material in which the permeability is approximately 1, and the saturation magnetization is about zero.

Austenite, also known as gamma phase iron (γ-Fe), is a metallic, non-magnetic allotrope of iron or a solid solution of iron with carbon. Heating the iron, iron-based metal, or steel to a temperature at which it changes crystal structure from ferrite to austenite is called austenitization. The addition of certain alloying elements, such as manganese, nickel, and carbon, can stabilize the austenitic structure even at room temperature. A dual phase magnetic component may be formed by stabilizing austenite at room temperature, in some regions of the magnetic component, while retaining the strongly ferromagnetic martensite or ferrite phases at some other regions of the magnetic component.

The presence of carbon is known to stabilize the non-magnetic austenite structure. Earlier efforts had been directed at dissolving formed carbides at selected regions of the magnetic component to stabilize non-magnetic phases at those regions of the magnetic component. In one embodiment of the present invention, a non-magnetic region of the magnetic component is formed by stabilizing a low permeability austenite structure by the addition of nitrogen, rather than carbon. Carbides as second phases are known to be undesirable for the magnetic component. Thus, in some embodiments of the present invention, the material forming the magnetic component is substantially free of carbon.

However, in other embodiments of the invention, the composition may contain a relatively small level of carbon, which can sometimes increase the tensile strength of the magnetic region. In these embodiments, the total amount of carbon in the magnetic and non-magnetic regions must be less than about 0.05 weight %.

The second (non-magnetic) region includes nitrogen in a quantity that stabilizes the austenite phase. Like carbon, as nitrogen dissolves into a ferrous alloy, the austenite phase is stabilized. Generally, the presence of carbides, which serve to stabilize the austenite phase upon local heat treatment and dissolution, is established by alloying the initial materials with carbon in the melt. When nitrogen is used to alloy iron, the workability of the alloy is often reduced. In certain embodiments of the present application, nitriding is used after substantial working of the component has been completed.

In one embodiment, a method of preparing a magnetic component is disclosed. Thermodynamic and empirical calculations may be used to predict ferrous alloy compositions that upon the addition of nitrogen at elevated temperatures form the austenite phase. A magnetic component using the designed ferrous alloy composition may be formed by using the traditional methods. In one embodiment, the formed magnetic component is subjected to selective nitriding of the near-final component, without the need to substantially alter the shape and size of the formed magnetic component after nitriding. As used herein the term "selective nitriding" is the nitriding of some (required) regions of the magnetic component, without substantially altering the ferromagnetic nature of the nearby regions. The ferromagnetic nature of the nearby regions may be considered to be "substantially altered", if the average saturation magnetization of those regions is reduced by more than about 5 percent.

The selective nitriding of the magnetic component may be attained by using different methods of nitriding. A chemical, physical, or mechanical block may be provided to the regions of the magnetic component where the nitriding is not desirable to retain the magnetism. For example, a chemical composition that discourages nitrogen diffusion into the magnetic component may be used as the "nitrogen stop-off" material at some regions. A physical method of selectively introducing the nitrogen at selected regions, while making the nitrogen unavailable for the other regions, may be used. A mechanical block may be able to mechanically prevent the diffusion of the nitrogen at certain regions.

Nitriding may be carried out through a solid, liquid, gaseous, or plasma route. In one embodiment of the present invention, elevated temperature gas nitriding is used as the preferred method to introduce nitrogen to the part. The elevated temperatures in this technique allow for fast diffusion of nitrogen, providing a quick processing route. Alternately, plasma nitriding may be used for the nitrogen diffusion. In order to avoid nitrogen diffusion in those areas which are intended to stay ferritic (and thus magnetic), in one embodiment, a mechanical mask or stop-off material is applied to locations where nitrogen diffusion is not desirable. Thus, in this embodiment, the pre-selected regions that correspond to the regions that are supposed to remain magnetic are masked, using a mechanical method, e.g., a nitrogen stop-off material. As used herein a "nitrogen stop-off material" is a material that is capable of substantially stopping the nitrogen from entering into that region. It is not necessary that the stop-off material itself contain nitrogen.

The magnetic component that is subjected to the selective nitriding may be exemplified in FIG. 1. The magnetic component 10 is the initial component that is formed by the ferromagnetic material, in the size and shape required for the final application. The magnetic component 10 is usually formed of a composition that has a very reduced concentration of carbon, and may be of any shape and size. For ease of understanding herein, the magnetic component 10 is envisaged to be in a rectangular shape with the top surface 12, and the bottom surface 14.

The magnetic component 10 has a certain length (l), width (w), and thickness (t). The magnetic component 10 includes two marked regions, a first region 20 and a second region 30. The regions are situated so that the masked region 20 in the surface portion of the component corresponds to the first region, and region 30 that is not masked by the nitrogen stop-off material corresponds to the second region. The first region 20 is designed to be the magnetic region, and is masked, using the nitrogen stop-off material (not shown) in the component 10. The second region 30 is not masked and hence allows the nitrogen to diffuse through the component 10, making the regions non-magnetic. One skilled in the art would understand that depending on the shape and size of the required magnetic and non-magnetic regions, the masks may be designed of different shapes and at different surfaces.

Nitrogen may be diffused into the component 10 through gas nitriding in a nitrogen-rich atmosphere, at a pressure greater than about 0.5 atmosphere, and a temperature greater than about 900 degree Celsius (° C.). Generally, the diffusion of nitrogen is expected to increase with a higher heat-treatment temperature, and an increased equilibrium surface concentration of nitrogen. The increased pressure of the gases surrounding the magnetic component 10 often leads to an increased surface concentration of nitrogen. Therefore, at a given condition in a pure nitrogen atmosphere, a higher than atmospheric pressure and a higher temperature will generally provide a faster nitriding process.

In one embodiment, a nitrogen-rich atmosphere is used. In one embodiment, the nitrogen-rich atmosphere includes more than about 90% of nitrogen. In one embodiment, nitriding is conducted in a substantially pure nitrogen atmosphere. The substantially pure nitrogen atmosphere may be created by filling nitrogen in a furnace cavity after evacuating the air from the furnace cavity, and purging with nitrogen or through the continuous flow of nitrogen during processing. In one embodiment, an ambient pressure of greater than 1 atmosphere and a temperature greater than about 900° C. is used for nitriding. In a further embodiment, the temperature of nitriding is greater than 1000° C.

Figure 2:
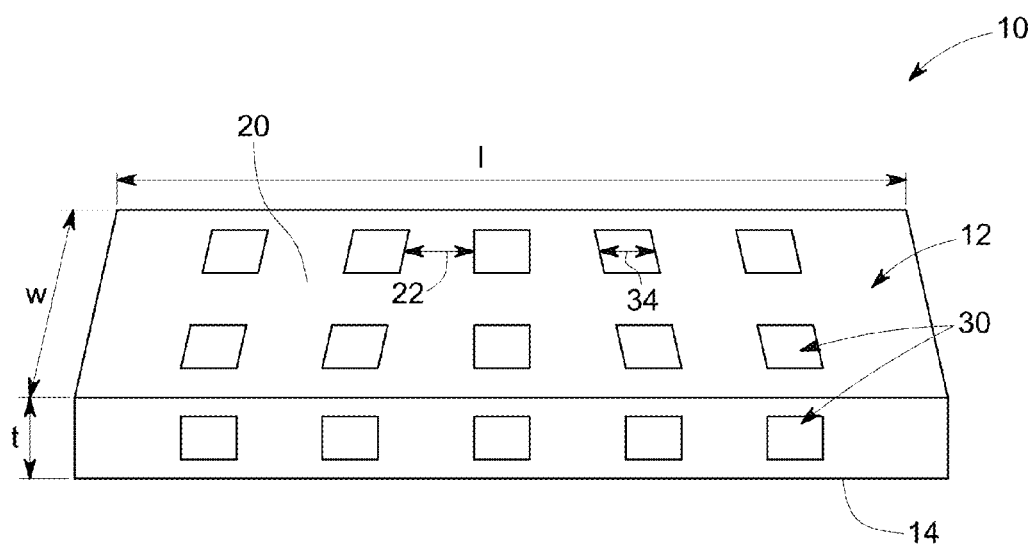
FIG. 2 illustrates a dual phase magnetic component, in accordance with another embodiment of the invention.

The nitrogen stop-off material masks may be applied to the component depending on the desired pattern of nitrogen diffusion (and non-diffusion) for the component 10. For example, in FIG. 1, the mask is at the surface region corresponding to the different first regions 20, and also at the surfaces covering the thickness of the component 10. Thus, in FIG. 1, nitriding would occur only through the unmasked regions 30 on the top and bottom surfaces 12, and 14, and not through the thickness t of the component. In FIG. 2, the surfaces through the thickness of the component 10 further include the masked and unmasked regions and hence, the nitrogen diffusion occurs from the top, bottom, and side surfaces in a controlled way.

When the magnetic component is subjected to gas nitriding, the nitrogen diffuses through the component, through all faces of the component 10, including the top surface 12, bottom surface 14, and all of the unmasked side surfaces of the component. The nitrogen during nitriding is diffused from the surfaces into the interior portions of the component 10 in the unmasked regions 30. This diffused nitrogen, in conjunction with the composition of the magnetic component, changes the local phase stability in those regions, and converts those regions into non-magnetic austenite. Even though the nitrogen diffuses through the surface, the nitriding parameters allow the nitrogen to diffuse further into the length, width, and thickness of the magnetic component, through all the surfaces of the magnetic component 10, while the masked regions 30 prevent substantial nitrogen diffusion through those regions.

The nitrogen may be diffusing into the interior of the component 10 through the non-masked surface regions, but depending on the pressure and temperature, and certain other parameters, the diffused nitrogen may also slightly undercut the surface masked regions 20, thereby diffusing into some of the interior regions 20. Hence, the strict boundaries of the magnetic and non-magnetic regions in the surface portion may be more diffuse in the interior portions. As a result, the percentage of non-magnetic regions in the interior portion is greater than the percentage of the non-magnetic regions in the surface portion. Thus, in one embodiment, the volume% of the second region in the interior portion is equal to or greater than the volume % of the second region in the surface portion. Thus, if a hypothetical line starting from the surface of a second, nonmagnetic, region is drawn through the interior portion in a direction perpendicular to the surface portion, it is highly likely that the perpendicular line encounters substantially 100% of the second region. However, the same may not always be true for a line that is drawn in the same manner, starting from the surface of a first, magnetic region. In one embodiment, an "undercut" of the non-magnetic phase is less than about 200 micrometers.

Through empirical and thermodynamic calculations, the parameters of nitriding may be adjusted, and the nitrogen diffusion at different directions may be predicted for certain regions of the magnetic component 10, and accordingly, the mask size and shape may be altered so that the end product obtained is approximately the desired outcome of the nitriding process.

The under-cutting of the non-magnetic phase may be less in the thinner magnetic components. In thinner components, the majority of the nitrogen diffuses through the top and bottom surfaces 12, and 14 respectively (FIG. 2), and the amount of undercut may be reduced. Additionally, less time is required to achieve through-thickness nitrogen penetration, thus reducing the amount of time in which additional nitrogen diffuses below the mask, creating the undercuts. In one embodiment, the thickness of the component 10 is in a range from about 0.1 mm to about 5 mm. The desired pattern of the magnetic and non-magnetic regions of this component may be obtained by diffusing the nitrogen through the selectively masked top surface 12 and bottom surface 14, keeping the side surfaces of the thickness t completely masked.

Width 22 (FIG. 2) of the mask of the masked region 20 is the dimension between unmasked regions 30, and may be designed as per the requirement of the magnetic component 10. In one embodiment, a width 34 of each of the second regions 30 in the surface is greater than about 0.5 mm. In a further embodiment, a width of each of the second regions 30 in a plane perpendicular to the thickness t is greater than about 0.5 mm. (As previously explained, the dimension "w" in FIG. 2 represents the overall width of the magnetic component 10.)

Nitriding of the magnetic component at designed conditions allows the introduction of a tailored amount of nitrogen to be diffused interstitially into the magnetic component. In one embodiment, the second (unmasked) region 30 includes greater than about 0.4% of nitrogen. The intermixing and the concentration of nitrogen is not only limited to the unmasked regions of the surface, but is present in both the surface portion and the interior portion of the magnetic component 10. The concentration of nitrogen in the surface portion and the interior portion need not be uniform.

Depending on the applications, the desired magnetic region and the non-magnetic region shapes and ratios may vary, and the diffusion of nitrogen may be designed to satisfy these requirements. Accordingly, in one embodiment, a volume percent of the first region in the surface and interior portions is equal to or greater than the volume percent of the second region in the surface and interior portions. In one embodiment, at least one of the first and second regions has an interconnected geometry. The "interconnected geometry" as used herein implies that a region is connected all through the component, and is hence not isolated completely from the similar regions, being surrounded by the other regions completely.

Figure 3:
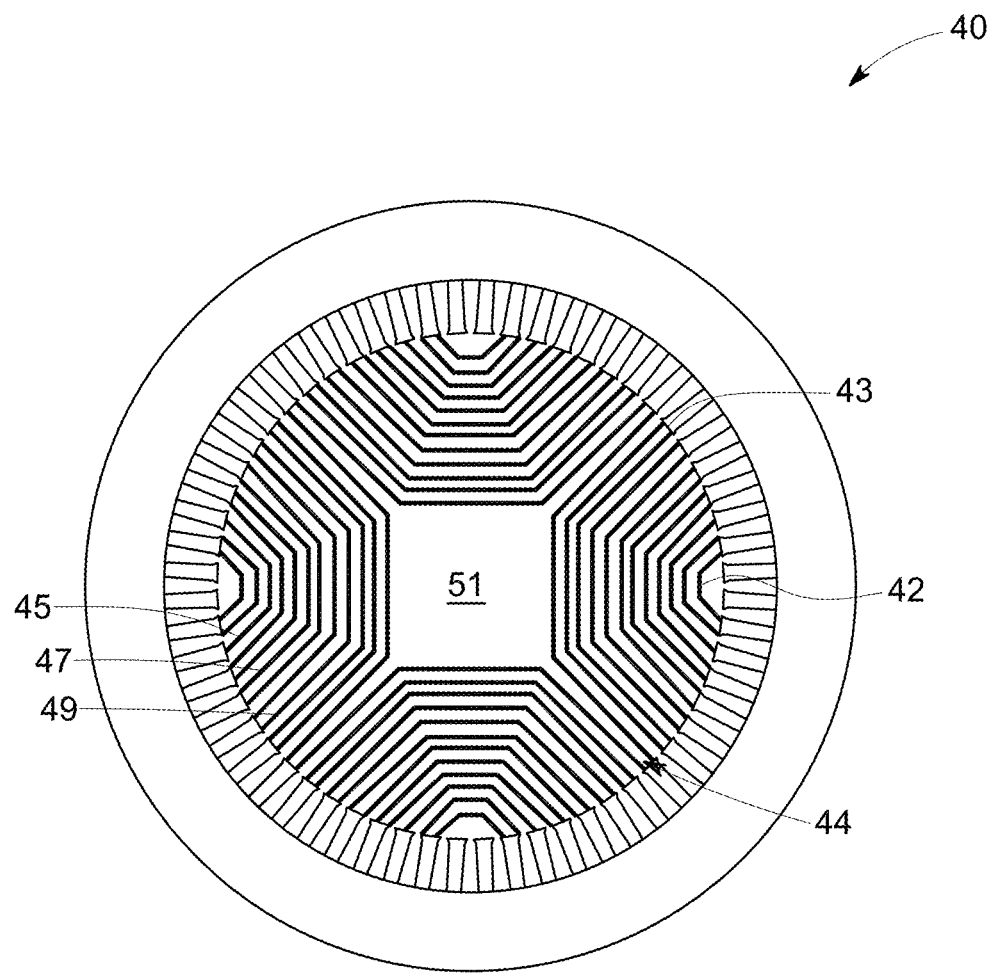
FIG. 3 illustrates an exemplary topology of a dual phase magnetic component, that may be obtained by using the methods described herein, in accordance with one embodiment of the invention.

Different topologies may be presented, having dual phase magnetic materials, by using this technology. Some of them are described in U.S. Pat. No. 7,489,062 (Shah et al), which is incorporated herein by reference. The reference describes a number of different types of synchronous reluctance machines, having a stator and a rotor shaft operationally disposed within the confines of the stator. FIG. 3 of the present Application shows an example of a topology that could benefit from the dual-phase materials. The component 40 can represent a portion of the reluctance machine, including a magnetic region 42 and a non-magnetic region 44, collectively referred to as "laminated segments" below. The selectively shaped rotor 43 of the component 40 is configured as a four-pole machine. Each pole can comprise a plurality of the axially-extending, radially positioned ("stacked") laminated segments 45, 47, 49, and the like, which extend from each pole, terminating at a central rotor shaft 51. As described in the Shah patent, the number of poles, and the number of laminations, can vary greatly, depending on the particular design of the reluctance machine.

With continued reference to FIG. 3, the laminated segments effectively guide the magnetic flux into and out of the rotor 43. The magnetic regions 42 constrain the path of the magnetic flux, while the nonmagnetic regions 44 ensure a relatively high density of magnetic flux lines coming out of the surface of the rotor, and going into an air gap between the rotor and the stator. In manufacturing these types of reluctance machines according to conventional techniques, magnetic and nonmagnetic laminations usually had to be assembled by various mechanical/metalworking steps, e.g., cutting and welding. The present inventors discovered that many of the desirable techniques could be obtained much more efficiently by the masking and nitriding process described herein.

EXAMPLE

The example that follows is merely illustrative, and should not be construed to be any sort of limitation on the scope of the claimed invention. Unless specified otherwise, all ingredients may be commercially available from common chemical suppliers.

Figure 4:
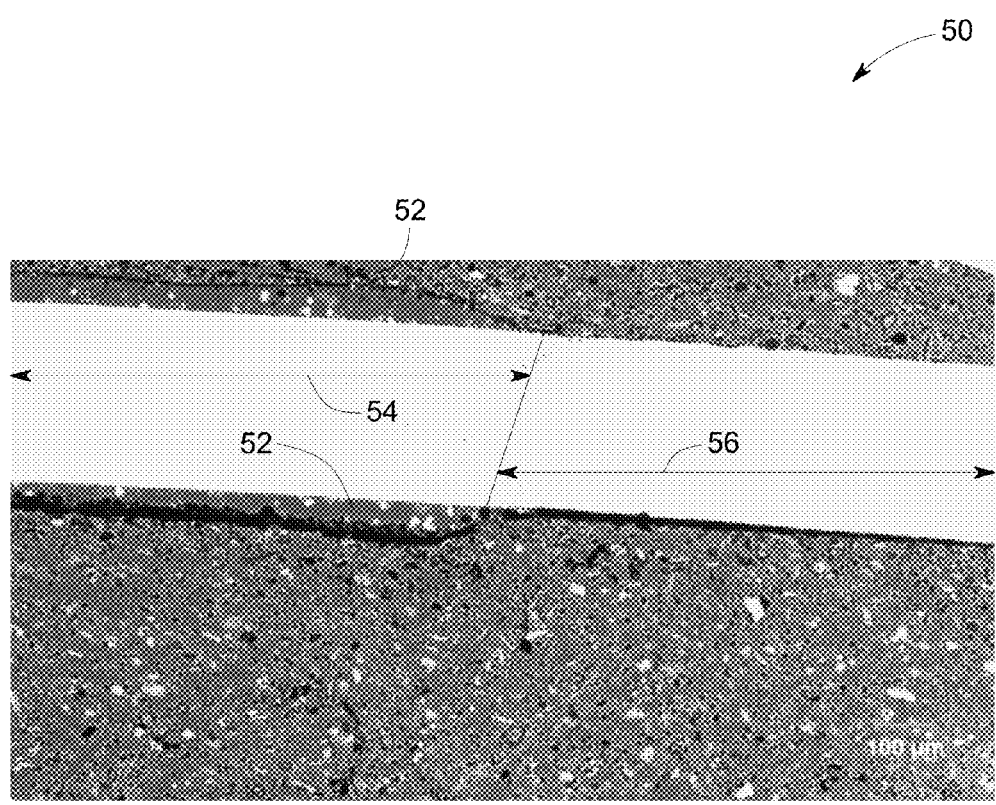
FIG. 4 is a cross-sectional view of a dual phase component prepared using the methods described herein, in accordance with one embodiment of the invention.
Figure 5:
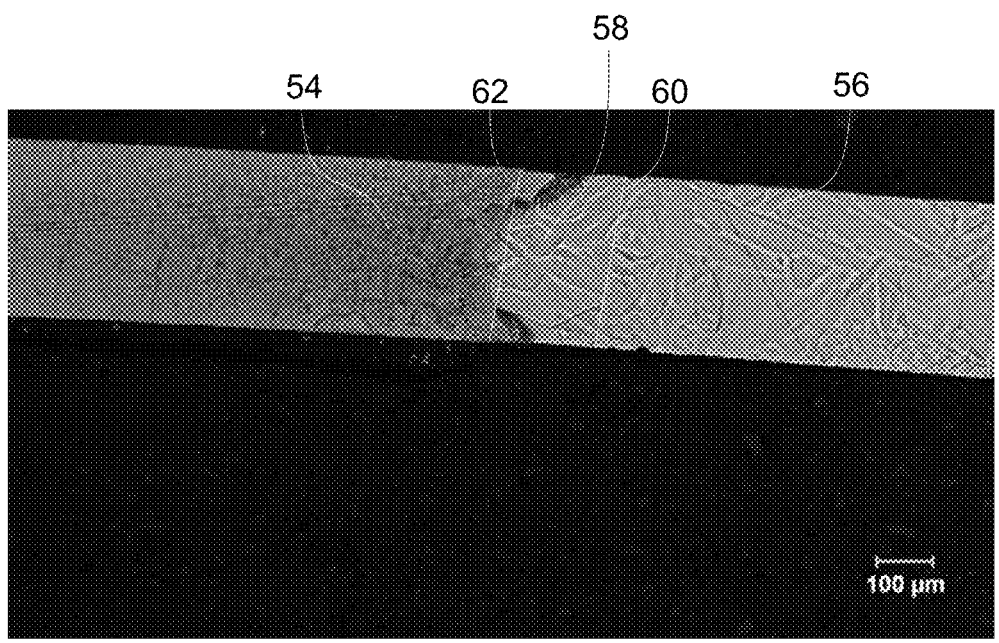
FIG. 5 is a cross-sectional view showing the microstructure difference between the first and second regions of a dual phase component prepared using the methods described herein, in accordance with one embodiment of the invention.

With reference, to FIG. 4, an example component 50 of Fe-20Cr-5Mn (in weight %) alloy was selected and was painted with a commercially available stop-off paint 52 over half the sample. The component was nitrided at 1150° C. in pure nitrogen at a pressure of 1 atm. FIG. 4 shows the cross-section along thickness t (as shown in FIG. 1) of the masked component 50 displaying the location of the stop off coating 52 used to mask the magnetic region 54 from nitriding. The region 56 was not masked and was exposed for nitriding. FIG. 5 generally shows the substantially ferritic microstructure of the magnetic region 54, and the changed, austenite microstructure in the region 56 that is exposed to nitriding. FIG. 5 further depicts the undercut region 58 during nitriding. Hence a line 60 drawn from the surface of the non-magnetic region through the thickness t may always encounter the non-magnetic region in the interior portion. However, a line 62 drawn from the magnetic surface region may or may not always encounter a magnetic region through the thickness, depending on the proximity of the line 62 to the non-magnetic region.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of preparing a magnetic component, comprising:
   mechanically masking pre-selected sections of a surface portion of the component, using a nitrogen stop-off material to form a masked region in the component; and
   heat-treating the component in a nitrogen-rich atmosphere at a temperature greater than about 900° C. to form intermixed first and second regions in the magnetic alloy, wherein
   (a) the first region comprises a magnetic phase;
   (b) the second region comprises a non-magnetic phase;
   (c) a concentration of carbon in both the first and second regions is zero or less than about 0.05 weight %; and
   (d) the second region comprises greater than about 0.1% of nitrogen.

2. The method of claim 1, wherein the masked region in the surface portion of the component corresponds to the first region, and a region that is not masked by the nitrogen stop-off material corresponds to the second region.

3. The method of claim 1, wherein a thickness of the component is in a range from about 0.1 mm to about 5 mm.

4. The method of claim 3, wherein a width of the second region in a plane perpendicular to the thickness is greater than about 0.5 mm.

5. The method of claim 1, wherein the nitrogen-rich atmosphere comprises more than about 90% of nitrogen.

6. The method of claim 1, wherein the nitrogen-rich atmosphere is maintained at a pressure greater than about 0.5 atmosphere.

7. The method of claim 6, wherein the pressure of the nitrogen-rich atmosphere is greater than 1 atm.

8. The method of claim 1, wherein the temperature of heat-treatment is greater than about 1000° C.

9. The method of claim 1, wherein the second region comprises greater than about 0.4 weight % of nitrogen.

10. The method of claim 1, wherein the magnetic component is a portion of a synchronous reluctance machine.

* * * * *